United States Patent
Ohshima et al.

(10) Patent No.: US 8,724,551 B2
(45) Date of Patent: May 13, 2014

(54) MOBILE COMMUNICATION SYSTEM, MOBILE STATION APPARATUS AND RE-CONNECTION METHOD

(75) Inventors: Akira Ohshima, Osaka (JP); Tadashi Shimonabe, Osaka (JP); Mitsuru Sakamoto, Osaka (JP); Yuhsuke Takagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 67 days.

(21) Appl. No.: 13/505,259

(22) PCT Filed: Nov. 2, 2010

(86) PCT No.: PCT/JP2010/069476
§ 371 (c)(1),
(2), (4) Date: Apr. 30, 2012

(87) PCT Pub. No.: WO2011/052775
PCT Pub. Date: May 5, 2011

(65) Prior Publication Data
US 2012/0218946 A1    Aug. 30, 2012

(30) Foreign Application Priority Data

Nov. 2, 2009   (JP) ................................. 2009-251916

(51) Int. Cl.
*H04Q 7/00*    (2006.01)
*H04L 1/00*    (2006.01)

(52) U.S. Cl.
USPC ........... 370/328; 370/338; 370/252; 370/509; 455/436; 455/437; 455/440

(58) Field of Classification Search
USPC .......... 370/328–338, 252, 509; 455/436, 437, 455/440, 442
See application file for complete search history.

(56) References Cited

U.S. PATENT DOCUMENTS 7,274,936 B2 *    9/2007    Zangi et al. ................... 455/442
(Continued)

FOREIGN PATENT DOCUMENTS

| JP | 2004-120112 A | 4/2004 |
| JP | 2004-207922 A | 7/2004 |
| WO | 2008/115897 A2 | 9/2008 |

OTHER PUBLICATIONS

3GPP TS 36.214 v8.5.0, "3rd Generation Partnership Project; Technical Specification Group Radio Access Network; Evolved Universal Terrestrial Radio Access (E-UTRA); Physical layer—Measurements (Release 8)", 2008-12.

(Continued)

*Primary Examiner* — Charles C Jiang
*Assistant Examiner* — Jamal Javaid
(74) *Attorney, Agent, or Firm* — Birch, Stewart, Kolasch & Birch, LLP

(57) ABSTRACT

It is possible to complete a re-connection in a short time and prevent instantaneous interruption of communication by including a plurality of base station apparatuses and a mobile station apparatus; the mobile station apparatus includes: a delay difference detecting unit that detects a difference in reception timing between a signal from the base station apparatus with which the mobile station apparatus currently communicates and a signal from the base station apparatus that is a re-connection destination candidate; a transmission timing calculating unit that calculates, based on the difference in reception timing, a transmission timing to the base station apparatus that is the re-connection destination candidate; and a re-connection processing unit that, having detected a disconnection of the communication with the base station apparatus with which the mobile station apparatus currently communicates, uses the transmission timing to start a communication with the base station apparatus that is the re-connection destination candidate.

10 Claims, 10 Drawing Sheets

(56) References Cited

U.S. PATENT DOCUMENTS

2007/0091849 A1* 4/2007 Park et al. .................. 370/331
2008/0227454 A1* 9/2008 Damnjanovic ............... 455/436
2009/0196250 A1* 8/2009 Feng et al. .................. 370/330

OTHER PUBLICATIONS

3GPP TSG RAN WG1 Meeting #55, R1-084615, "TR 36.814 v0.20 Further Advancements for E-UTRA Physical Layer Aspects (Release X)", Nov. 10-14, 2008.
International Search Report, dated Jan. 25, 2011, issued in PCT/JP2010/069476.

* cited by examiner

MOBILE COMMUNICATION SYSTEM, MOBILE STATION APPARATUS AND RE-CONNECTION METHOD

TECHNICAL FIELD

The present invention relates to a mobile communication system, a mobile station apparatus, and a re-connection method.

The present application claims priority based on the patent application No. 2009-251916 filed in Japan on Nov. 2, 2009 and incorporates by reference herein the content thereof.

BACKGROUND ART

At present, with regard to mobile communication technology, work is underway on standardizing LTE-A (LTE-Advanced), which is an advanced standard of the LTE (Long-Term Evolution: $3^{rd}$ Generation) in the 3GPP ($3^{rd}$ Generation Partnership Project). Whereas in LTE communication is performed between a base station apparatus and a mobile station apparatus on a one-to-one basis, technology known as CoMP (coordinated multiple-point transmission and reception), which performs communication with a mobile station apparatus by a plurality of base station apparatuses sharing information and cooperating is being investigated, is expected to have the effect of improving the user throughput and cell throughput at the edge of a cell in comparison with LTE (refer to Non-Patent Reference 1).

With regard to CoMP, investigations are being done with regard to both the uplink and the downlink. In downlink CoMP, there are two general methods that are being investigated. One is a method in which, although one-to-one communication is performed with the base station apparatuses the same as in LTE, scheduling and beam forming cooperation is done by a plurality of adjacent base station apparatuses sharing information, thereby reducing interference. The other is a method in which, in contrast to LTE, simultaneous data transmission is done to one mobile station apparatus by a plurality of base station apparatuses, these data being linked and demodulated at the mobile station apparatus to improve quality. With regard to uplink CoMP, a method is being investigated whereby a plurality of base station apparatuses receive a signal from a mobile station apparatus and link these to improve quality.

The physical layers in LTE and LTE-A will now be described. In the physical layer, the physical channels and physical signal are defined. Six types of downlink physical channels are defined, these being:
PDSCH (Physical Downlink Shared Channel);
PBCH (Physical Broadcast Channel);
PMCH (Physical Multicast Channel);
PCFICH (Physical Control Format Indicator Channel);
PDCCH (Physical Downlink Control Channel); and
PHICH (Physical Hybrid ARQ Indicator Channel).

Two types of downlink physical signals are defined, these being:
RS (Reference Signal) and
SS (Synchronization Signal).

Three types of uplink physical channels are defined, these being:
PUSCH (Physical Uplink Shared Channel);
PUCCH (Physical Uplink Control Channel); and
PRACH (Physical Random Access Channel).

Only one type of uplink physical signal is defined, this being RS (Reference Signal).

PDSCH and PUSCH are physical channels used mainly for transmitting user data and control data. PBCH is a physical channel for transmitting notification information. PMCH is a physical channel for transmitting multicast data of broadcasts and the like. PCFICH is a physical channel for notification of the number of PDCCH symbols. PDCCH is a physical channel for transmitting commands and the like for PDSCH and PUSCH scheduling and TPC (Transmit Power Control). PHICH is a physical channel for transmitting an ACK/NACK of an HARQ (Hybrid ARQ (Automatic Repeat Request)) with respect to the PUSCH.

PUCCH is a physical channel for transmitting an ACK/NACK of an HARQ with respect to PDSCH, CQI (Channel Quality Information), PMI (Precoding Matrix Indication), RI (Rank Indication) and the like. PRACH is a physical channel for transmitting a random-access preamble. The uplink and downlink RS is defined as a physical signal used in channel prediction and the measurement of the CQI, and SS is defined as a physical signal used for cell searching.

In mobile communication technology, when a disconnect occurs during communication between a mobile station apparatus and a base station apparatus, re-connection is done. Because it is desirable that the time required for this re-connection be further shortened, it is necessary for the mobile station apparatus to select the base station apparatus that is to be the re-connection destination and to complete re-connection processing more quickly. Re-connection processing will be described below. FIG. 12 shows an example of the positional relationships between a mobile station apparatus and base station apparatuses in a conventional mobile communication system. The mobile station apparatus A is positioned at the edge of the cell A of the base station apparatus A, and communicates with the base station apparatus A. In the case in which the signal quality deteriorates during communication between the mobile station apparatus A and the base station apparatus A and a disconnect occurs, the mobile station apparatus A performs a band search and measures the received level of RS (Reference Signal), the path loss, and the SNR (signal-to-noise ratio) and the like, which are the quality of the signals of the nearby base station apparatuses A, B, and C. There are cases in which, as noted in Non-Patent Reference 2, the RSRP (Reference Signal Received Power), which indicates the average received power of the reference signal, is measured.

As a result of this measurement, the mobile station apparatus A takes a base station apparatus having good signal quality that is at least a certain level as a re-connection destination base station apparatus candidates, and selects the re-connection destination from these candidates. In this case, if the base station apparatus B is selected, the mobile station apparatus A sends a random-access signal to the base station apparatus B for the purpose of establishing synchronization with the base station apparatus B, and performs random-access processing. In the random-access processing, the transmission timing from the mobile station apparatus A is adjusted, and notification is made by the base station apparatus B to the mobile station apparatus A of information regarding the transmission timing. After that, the mobile station apparatus A, based on this information, begins communication with the base station apparatus B.

In Patent Reference 1, art is proposed in which, by making a selection that excludes a base station apparatus that has been disconnected, the time required for a band search is reduced.

Prior Art Documents

Patent Reference 1: Japanese Patent Application Publication No. JPA 2004-120112
Non-Patent Reference 1: 3GPP R1-084615 (TR36.814 v0.2.0), Chapter 8 (Coordinated Multiple-Point Transmission and Reception)
Non-Patent Reference 2: 3GPP, TR36.214 v8.5.0 Physical Layer—Measurement

DISCLOSURE OF INVENTION

Problem to be Solved by the Invention

In the art of Patent Reference 1, however, although the amount of time required for band searching is reduced, if the number of base station apparatuses that are searched is large, the amount of time required for the band search becomes great and, because random-access processing is performed thereafter, the time required for re-connection becomes long, and there is the problem in which instantaneous interruption of communication may occur.

The present invention, in consideration of the above-noted situation, has as an object the provision of a mobile communication system, a mobile station apparatus, and a re-connection method capable of completing re-connection in a short time, and preventing the occurrence of an instantaneous interruption of communication and the like.

(1) A first aspect of the present invention is a mobile communication system including a plurality of base station apparatuses and a mobile station apparatus; the mobile station apparatus including: a delay difference detecting unit that detects a difference in reception timing between a signal from the base station apparatus with which the mobile station apparatus currently communicates and a signal from the base station apparatus that is a re-connection destination candidate; a transmission timing calculating unit that calculates, based on the difference in reception timing, a transmission timing to the base station apparatus that is the re-connection destination candidate; and a re-connection processing unit that, having detected a disconnection of the communication with the base station apparatus with which the mobile station apparatus currently communicates, uses the transmission timing, which has been calculated in advance, to start a communication with the base station apparatus that is the re-connection destination candidate decided in advance.

(2) In the first aspect of the present invention, the mobile station apparatus may include a signal quality measuring unit that measures a signal quality with respect to the base station apparatus, and the mobile station apparatus or the base station apparatus may include a re-connection destination candidate deciding unit that decides the base station apparatus that is the re-connection destination candidate based on the measured signal quality.

(3) In the first aspect of the present invention, the signal quality measuring unit may periodically measure a signal quality and the delay difference detecting unit may periodically detect the difference in reception timing.

(4) In the first aspect of the present invention, the period with which the signal quality measuring unit measures a signal quality and the delay difference detecting unit detects the difference in reception timing may be variable.

(5) In the first aspect of the present invention, the base station apparatus may instruct the mobile station apparatus of the timing for measuring a signal quality by the signal quality measuring unit and the timing for detecting the difference in reception timing by the delay difference detecting unit.

(6) In the first aspect of the present invention, the base station apparatus may include a re-connection destination notifying unit that notifies a re-connection destination candidate to the base station apparatus that is the re-connection destination candidate decided by the re-connection destination candidate deciding unit.

(7) A second aspect of the present invention is a mobile station apparatus communicating with a plurality of base station apparatuses; the mobile station apparatus including: a delay difference detecting unit that detects a difference in reception timing between a signal from the base station apparatus with which the mobile station apparatus currently communicates and a signal from the base station apparatus that is a re-connection destination candidate; a transmission timing calculating unit that calculates, based on the difference in reception timing, a transmission timing to the base station apparatus that is the re-connection destination candidate; and a re-connection processing unit that, upon detecting a disconnection of the communication with the base station apparatus with which the mobile station apparatus currently communicates, uses the transmission timing, which has been calculated in advance, to start a communication with the base station apparatus that is the re-connection destination candidate decided in advance.

(8) A third aspect of the present invention is a re-connection method in a mobile communication system including a plurality of base station apparatuses and a mobile station apparatus; the re-connection method including: detecting, by the mobile station apparatus, a difference in reception timing between a signal from the base station apparatus with which the mobile station apparatus currently communicates and a signal from the base station apparatus that is a re-connection destination candidate that is decided in advance; calculating, by the mobile station apparatus, based on the difference in reception timing, a transmission timing to the base station apparatus that is the re-connection destination candidate; and starting, by the mobile station apparatus, a communication with the base station apparatus that is the re-connection destination candidate, when having detected a disconnection of the communication with the base station apparatus with which the mobile station apparatus currently communicates, using the transmission timing, which has been calculated in advance.

Effect of the Invention

The present invention can complete a re-connection in a short time and prevent instantaneous interruption of communication when re-connecting, without performing band searching and random-access processing.

BEST MODE FOR CARRYING OUT THE INVENTION

[First Embodiment]

A first embodiment of the present invention will be described below, with references made to the drawings.

First, the physical layer in the mobile communication system 100 of this embodiment will be described. The physical layer in the mobile communication system 100 is the same as the physical layer in LTE and LTE-A. That is, in the physical layer, physical channels and physical signals are defined, the six defined downlink physical channels being PDSCH (Physical Downlink Shared Channel), PBCH (Physical Broadcast Channel), PMCH (Physical Multicast Channel), PCFICH (Physical Control Format Indicator Channel), PDCCH (Physical Downlink Control Channel), and PHICH (Physical Hybrid Automatic Repeat Request Indicator Channel), and the two defined downlink physical signals being RS (Reference Signal) and SS (Synchronization Signal). The three defined uplink physical channels are PUSCH (Physical Uplink Shared Channel), PUCCH (Physical Uplink Control Channel), and PRACH (Physical Random Access Channel). There is only one uplink physical signal, RS (Reference Signal) that is defined.

Figure 1:
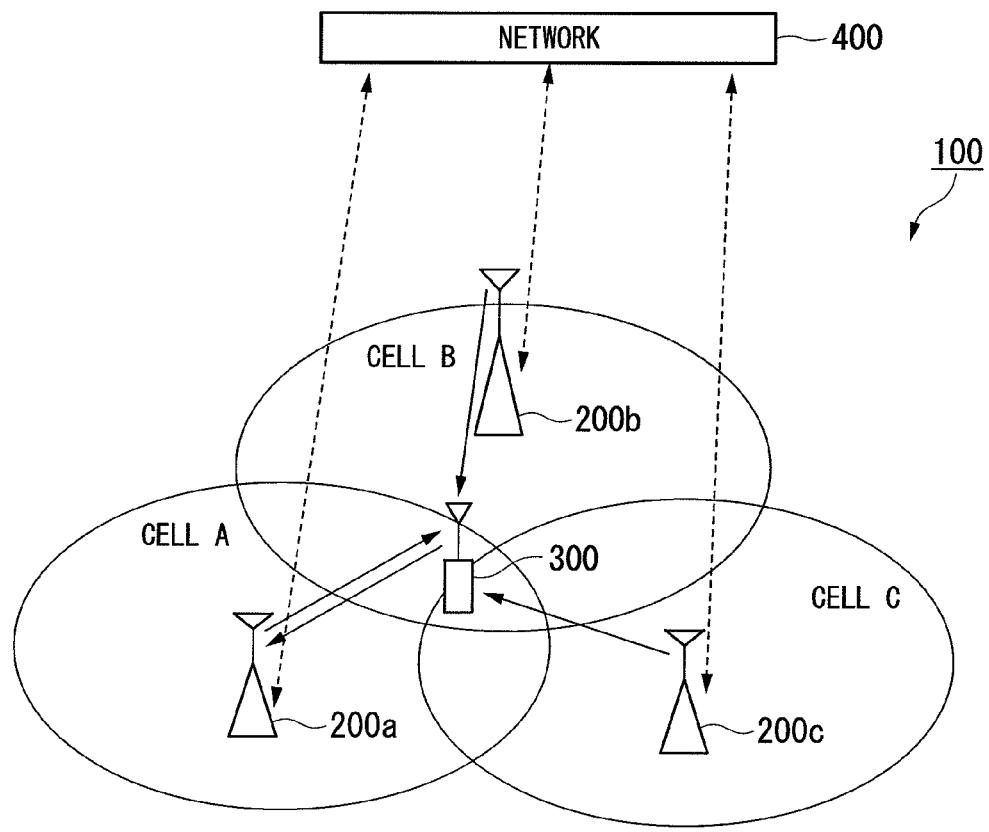
FIG. 1 is a simplified configuration drawing showing the constitution of a mobile communication system 100 in a first embodiment of the present invention.

FIG. 1 is a simplified configuration drawing showing the constitution of the mobile communication system 100 in the present embodiment. The mobile communication system 100 has a base station apparatus 200a, a base station apparatus 200b, a base station apparatus 200c, a mobile station apparatus 300, and a network 400. The base station apparatuses 200a, 200b, and 200c each constitute, respectively, cells A, B, and C, which are areas within which communication with the mobile station apparatus 300 is possible, the base station apparatuses being connected via the network 400. The base station apparatuses 200a, 200b, and 200c and the mobile station apparatus 300 perform wireless communication. Although only one mobile station apparatus 300 is shown in FIG. 1, there may be a plurality thereof and, although there are three base station apparatuses 200a, 200b, and 200c, the number thereof may exceed three.

In the mobile communication system 100 shown in FIG. 1, communication is performed by CoMP (Coordinated Multipoint Transmission/Reception). The downlink data is transmitted simultaneously from the base station apparatus 200a, the base station apparatus 200b, and the base station apparatus 200c. That is, transmission timings of the base station apparatuses 200a, 200b and 200c are synchronized, and the mobile station apparatus 300 simultaneously receives the PDSCH transmitted from the base station apparatus 200a, the base station apparatus 200b, and the base station apparatus 200c, and demodulates data. In order to demodulate the PDSCH, the mobile station apparatus 300 receives the PDCCH that transmits scheduling information, PCFICH that is necessary to receive PDCCH, and RS that is necessary to predict the channel, respectively. With regard to the PDCCH and the PCFICH, signals transmitted from the base station apparatus 200a are received. This includes the scheduling information of the PDSCH that is transmitted from the three base station apparatuses 200a, 200b, and 200c. With regard to the RS, signals transmitted from the base station apparatus 200a, the base station apparatus 200b, and the base station apparatus 200c are received for the purpose of predicting the channel. In this case, the cell of the base station apparatus that transmits the PDCCH received by the mobile station apparatus 300 (cell A in FIG. 1) is referred to as the anchor cell.

Because the mobile station apparatus 300 transmits only to the base station apparatus 200a with regard to the uplink data, only the base station apparatus 200a receives the Physical Uplink Shared Channel PUSCH. Therefore, the base station apparatus 200a receives the Physical Hybrid ARQ Indicator Channel PHICH that notifies the ACK/NACK of HARQ with respect to the Physical Uplink Shared Channel PUSCH. For the mobile station apparatus 300 to transmit ACK/NACK of the HARQ with respect to the Physical Downlink Shared Channel PDSCH, it is necessary to transmit the Physical Uplink Control Channel PUCCH, but the Physical Uplink Control Channel PUCCH is received only by the base station apparatus 200a that constitutes the anchor cell.

The Reference Signal RS, which is necessary for demodulating the Physical Uplink Shared Channel PUSCH and the Physical Uplink Control Channel PUCCH is also only received by the base station apparatus 200a. Therefore, if the ACK/NACK of an HARQ with respect to the Physical Downlink Shared Channel PDSCH that is transmitted from the base station apparatus 200b is necessary, notification is made to the base station apparatus 200b from the base station apparatus 200a, via the network 400. Also, if necessary, the CQI (Channel Quality Indicator) required for scheduling is notified to the base station apparatus 200b from the base station apparatus 200a, via the network. Therefore, the uplink physical channels and signals are normally received only by the base station apparatus 200a.

In mobile communication, when the mobile station apparatus 300 and the base station apparatus 200a are performing voice or data communication, the mobile station apparatus 300 might move, for example, so that an obstacle such as a building comes between the mobile station apparatus 300 and the base station apparatus 200a, thereby causing a sudden deterioration in the receiving quality. In such a case, the mobile station apparatus 300 performs re-connection processing that connects to another base station apparatus with which the receiving quality is good.

Conventionally, in re-connection processing the mobile station apparatus has performed band searching and measured the quality of the signal from nearby base station apparatuses, taking base station apparatuses having good signal quality that is at least a certain level as re-connection destination base station apparatus candidates and selecting the re-connection destination from among them. In order to establish synchronization with the selected base station apparatus, the mobile station apparatus transmits to the selected the base station apparatus a random-access signal on the Physical Random-Access Channel PRACH and performs random access processing. In the random access processing, the transmission timing from the mobile station apparatus is adjusted, and the base station apparatus makes notification to the mobile station apparatus of information regarding the transmission timing. After that, the mobile station apparatus, based on this information, establishes synchronization and begins communication with the base station apparatus.

In the present embodiment, the re-connection destination base station apparatus candidate is decided between the mobile station apparatus 300 and the base station apparatus 200a in advance and, with regard to the transmission timing adjustment to be made in the random access processing when re-connecting, the mobile station apparatus 300 calculates the transmission timing for transmission in advance, the switching of the base station apparatuses being performed instantaneously, without performing band searching and random-access processing when re-connecting. The present embodiment is described below.

Figure 2:
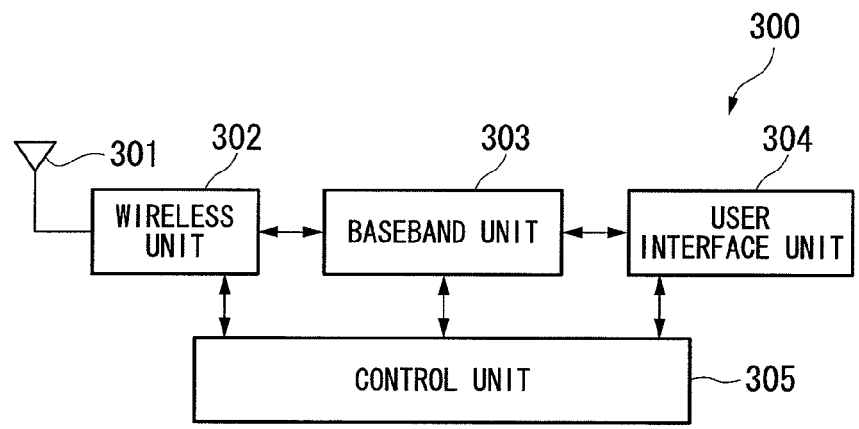
FIG. 2 is a simplified block diagram showing the constitution of a mobile station apparatus 300 in the same embodiment.

FIG. 2 is a simplified block diagram showing the constitution of the mobile station apparatus 300. The mobile station apparatus 300 is constituted so as to include an antenna 301 that transmits and receives a wireless signal, a wireless unit 302 that performs up-conversion/down-conversion between the transmitted/received wireless signal and a baseband signal and conversion between analog signals and digital signals, a baseband unit 303 that measures the receiving quality and the reception timing of signals from the base station apparatuses 200a, 200b, and 200c and modulates and demodulates user information and control information that is transmitted and received, a user interface unit 304 that input and outputs user information, and a control unit 305 that controls various units so that the re-connection destination base station apparatus candidates are decided from the receiving quality and notified to the base station apparatuses.

Figure 3:
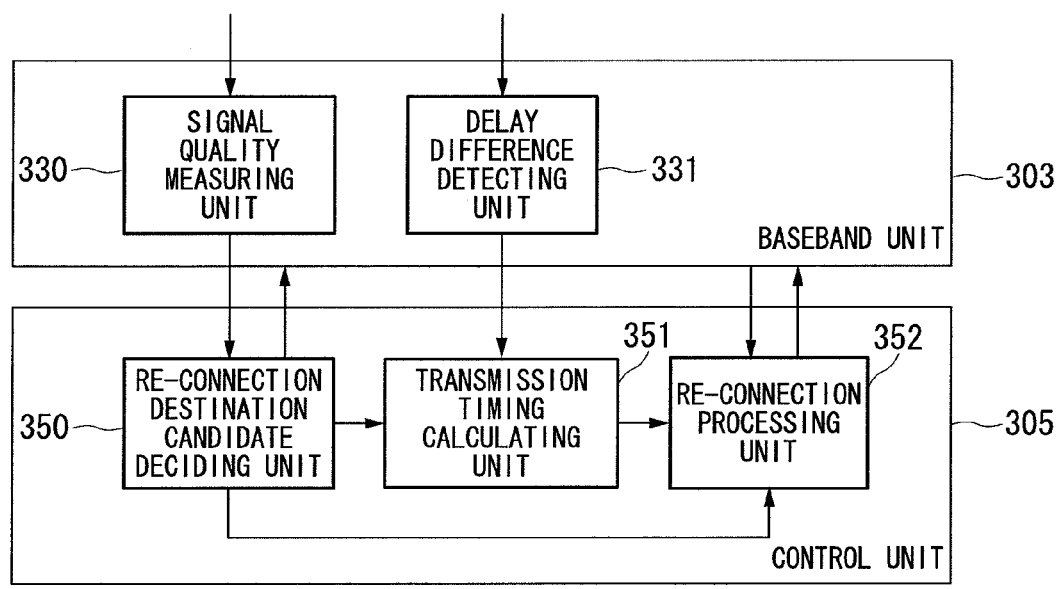
FIG. 3 is a simplified block diagram showing the constitution of a baseband unit 303 and a control unit 305 of the mobile station apparatus 300 in the same embodiment.

FIG. 3 is a simplified block diagram showing the constitution of the baseband unit 303 and the control unit 305 of the mobile station apparatus 300. The baseband unit 303 has a signal quality measuring unit 330 and a delay difference detecting unit 331. The control unit 305 has a re-connection destination candidate deciding unit 350, a transmission timing calculating unit 351, and a re-connection processing unit 352. The signal quality measuring unit 330, based on the received signal received and converted to a digital signal by the wireless unit 302, measures the signal quality with regard to each of the base station apparatuses. The delay difference detecting unit 331, based on the received signal received and converted to a digital signal by the wireless unit 302, detects the different in reception timing between the signal from the base station apparatus with which it is currently communicating and the signal from re-connection destination candidate base station apparatus. The re-connection destination candidate deciding unit 350, based on the signal quality measured by the signal quality measuring unit 330, decides the re-connection destination candidate base station apparatus. The re-connection destination determining unit 350 also makes notification to the base station apparatus with which communication is currently in progress of the decided re-connection destination base station apparatus. The transmission timing calculating unit 351, base on the different in reception timing detected by the delay difference detecting unit 331, calculates the timing of transmission to the re-connection destination candidate base station apparatus decided by the re-connection destination candidate deciding unit 350. The re-connection processing unit 352, upon detection of the disconnecting from a base station apparatus during communication, using the transmission timing calculated in advance by the transmission timing calculating unit 351, performs re-connection processing and starts communication with the re-connection destination candidate base station apparatus decided in advance by the re-connection destination candidate deciding unit 350.

Figure 4:
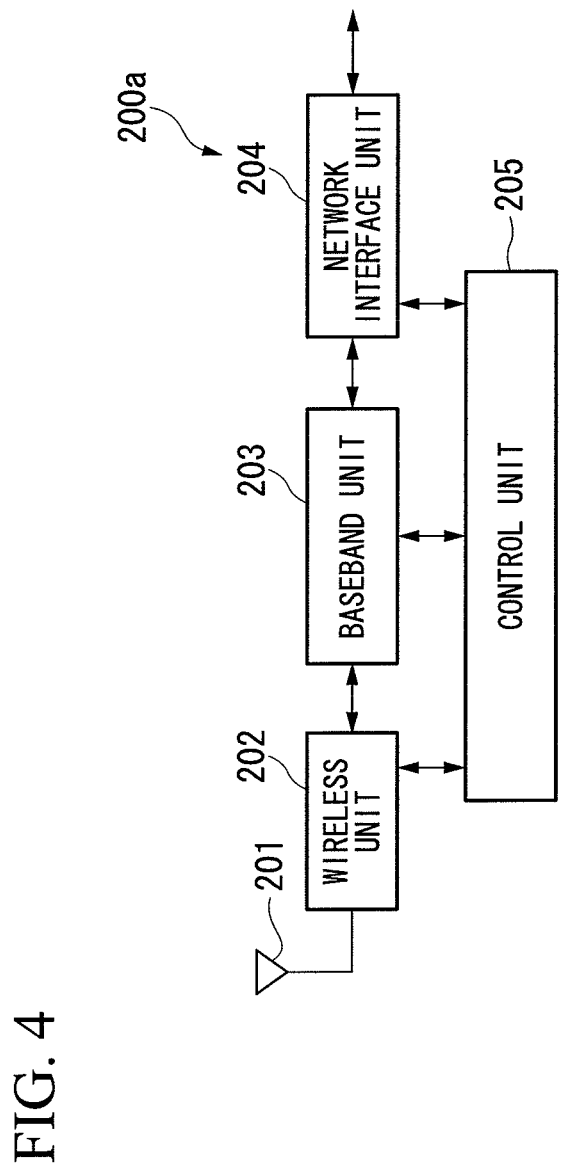
FIG. 4 is a simplified block diagram showing the constitution of a base station apparatus 200a in the same embodiment.

FIG. 4 is a simplified block diagram showing the constitution of the base station apparatus 200a. Because the base station apparatuses 200b and 200c have the same constitution as that of the base station apparatus 200a, the description thereof is omitted herein. The base station apparatus 200a is constituted to include an antenna 201 that transmits and receives wireless signals, a wireless unit 202 that performs up-conversion/down-conversion between the transmitted/received wireless signal and a baseband signal and conversion between analog signals and digital signals, a baseband unit 203 that modulates and demodulates user information and control information that is transmitted and received, a network interface unit 204, connected to the network 400, and that inputs and outputs user information and control information, and a control unit 205 that controls various units so that the re-connection destination base station apparatus candidate notified from the mobile station apparatus 300 is notified to the other base station apparatuses.

Figure 5:
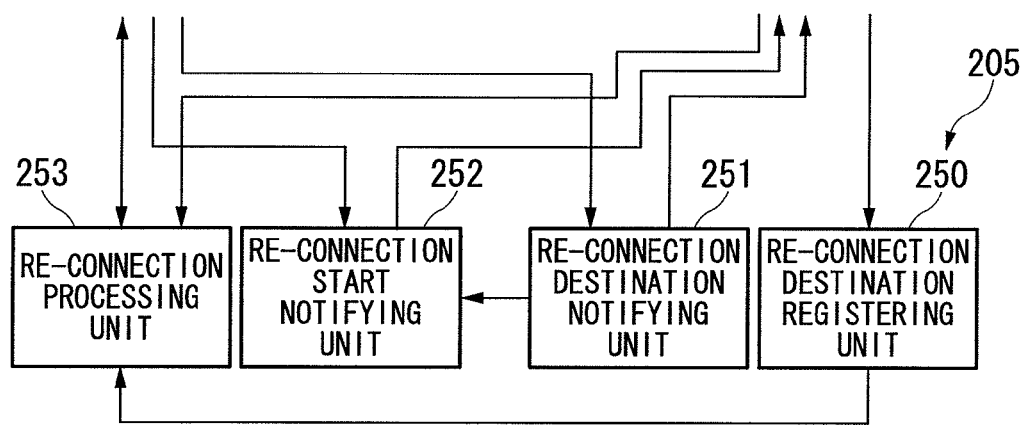
FIG. 5 is a simplified block diagram showing the constitution of a control unit 205 of the base station apparatus 200a in the same embodiment.

FIG. 5 is a simplified block diagram showing the constitution of the control unit 205 in the base station apparatus 200a. The control unit 205 has a re-connection destination registering unit 250, a re-connection destination notifying unit 251, a re-connection start notifying unit 252, and a re-connection processing unit 253. The re-connection destination registering unit 250, upon receiving, via the network 400 (network interface unit 204) from another base station apparatus, by notification by the mobile station apparatus has taken this base station apparatus as the re-connection destination candidate, registers the information indicating that mobile station apparatus. When the re-connection destination notifying unit 251 receives by a wireless signal the notification from the mobile station apparatus of deciding the re-connection destination candidate (baseband unit 203), the mobile station identification information indicating the mobile station apparatus of the transmitting source of the notification and the base station identification information indicating the re-connection destination base station apparatus are associated and stored, and the notification is transmitted, via the network 400 (network interface unit 204) to the base station apparatus that has become the re-connection destination candidate.

The re-connection start notifying unit 252, for example, uses a judgment condition, such as an error rate in the receiving results obtained from the baseband unit 203 exceeding a threshold value that is set in advance, to detect a disconnect from the mobile station apparatus 300 during communication. When the disconnect is detected by the re-connection start notifying unit 252, the re-connection destination notifying unit 251 requests the start of re-connection with the mobile station apparatus 300 with which the disconnect of communication was detected, to the base station apparatus indicated by base station identification information that had been stored in association with mobile station identification information indicating the mobile station apparatus 300, that is, to the base station apparatus that is the re-connection destination candidate for the mobile station apparatus 300. This notification is transmitted via the network 400 (network interface unit 204). When the re-connection processing unit 253 receives the re-connection start request via the network 400, it performs re-connection processing between itself and the mobile station apparatus 300 (baseband unit 203) for which the notification was made.

Figure 6:
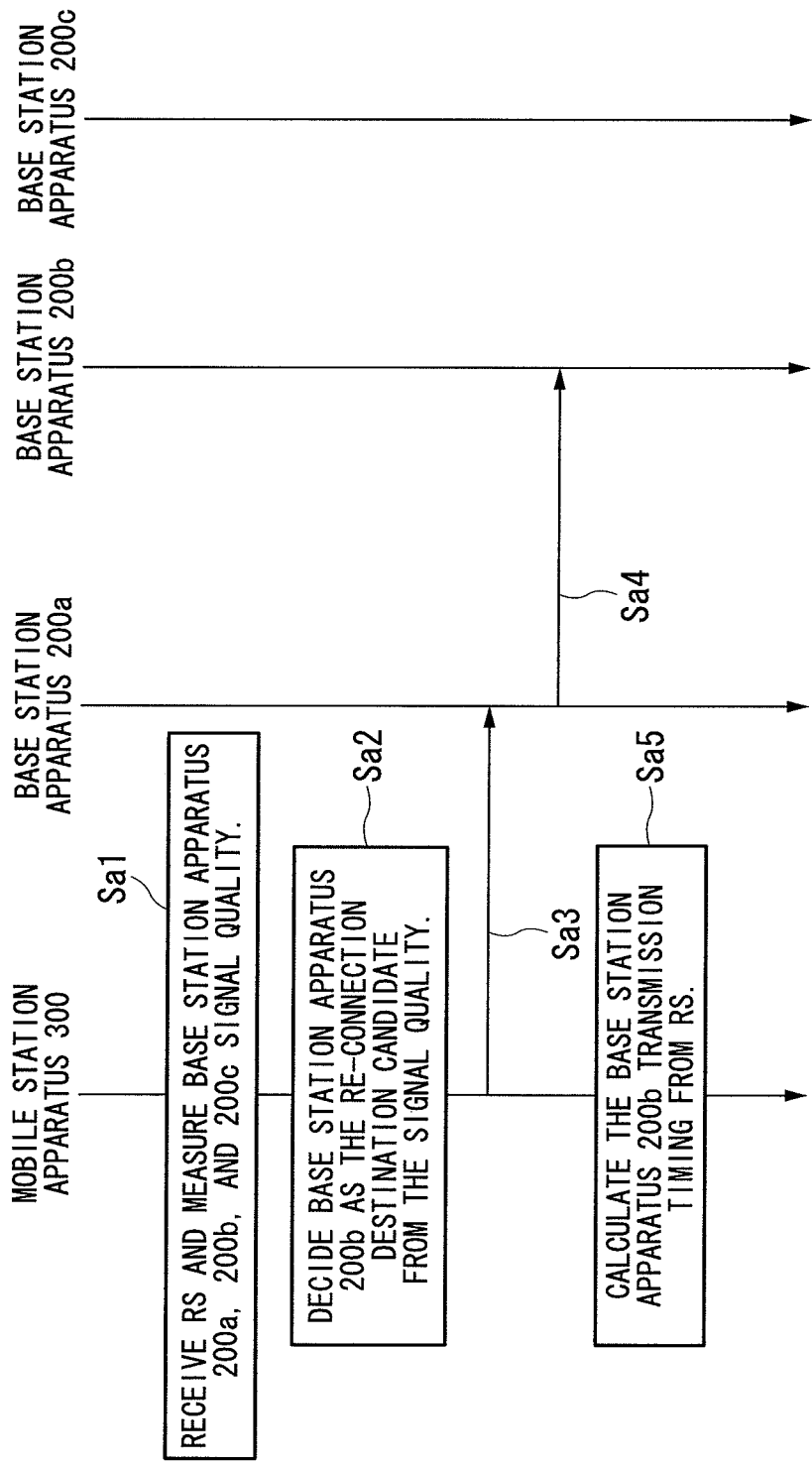
FIG. 6 is a sequence diagram describing the flow in a method for deciding next re-connection destination candidate and the timing of transmission to the next candidate in the same embodiment.

FIG. 6 is a sequence diagram describing the flow in a method for deciding the next re-connection candidate and the timing of transmission to the next candidate. First, the next re-connection candidate is decided. The mobile station apparatus 300 receives a reference signal RS, which is a known pattern, from the base station apparatus 200a, the base station apparatus 200b, and the base station apparatus 200c, and the signal quality measuring unit 330 measures the quality of the signals received from the base station apparatuses (Sa1). In this case, the quality of the received signals is judged by the SNR. The signal quality measuring unit 330 calculates the SNR by Equation (1).

$$SNR = |\bar{x}|^2 \bigg/ \left( \frac{1}{N} \sum_{i=1}^{N} |x_i - \bar{x}|^2 \right) \quad (1)$$

In the above, $x_i$ is the i-th received symbol of the reference signal RS, and the phase is adjusted in a fixed direction by taking the difference with the known pattern. The symbol N is the number of received symbols of the reference signal RS in the signal of which the SNR is being evaluated. The symbol x bar (the x with the overbar) is the value that is subjected to average processing for the above-noted received symbols of the reference signal RS. The average processing may be performed with respect to received symbols of the reference signal RS of the signal being evaluated for SNR, and may also be performed with respect to received symbols of the reference signal RS over a broader scope. The numerator in Equation (1) is the average received signal power, and is obtained by squaring x bar. The denominator in Equation (1) is the noise signal power, and is obtained by averaging the squaring the difference between $x_i$ and x bar.

The re-connection destination candidate deciding unit 350 of the mobile station apparatus 300 decides the re-connection candidate as a base station apparatus having good signal quality, excluding the base station apparatus 200a, which constitute the anchor cell (Sa2) (the base station apparatus 200b being the re-connection candidate in this case), and notifies the base station apparatus 200a of this information (Sa3: re-connection destination candidate notification). The re-connection destination notification unit 251 of the base station apparatus 200a transmits this notification, via the network 400, to the base station apparatus 200b, which is the base station apparatus that is the re-connection destination candidate (Sa4: Notification of being the re-connection destination candidate). The transmission timing calculating unit 351 of the mobile station apparatus 300, using the received reference signal RS, measures the offset between the reception timing of the signal from the base station apparatus 200a and the reception timing of the signal from the base station apparatus 200b, which is the re-connection candidate and, based on the measured offset, calculates the timing of transmission to the base station apparatus 200b, which is the re-connection destination candidate (Sa5).

Figure 7:
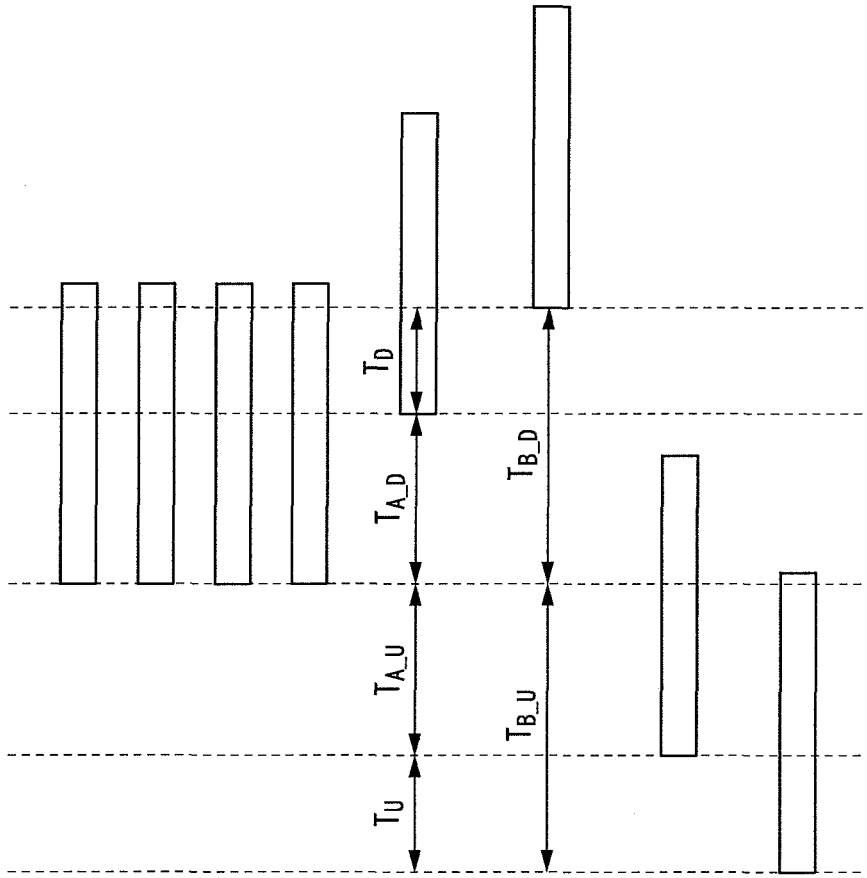
FIG. 7 is a drawing describing the method of a transmission timing calculating unit 351 calculating the timing of transmission to a base station apparatus that is the re-connection destination candidate in the same embodiment.

FIG. 7 is a drawing describing the method of the transmission timing calculating unit 351 calculating the timing of transmission to the base station apparatus that is the re-connection destination candidate. In the present embodiment, the transmission timing T1 of the base station apparatus 200a, the reception timing T2 of the base station apparatus 200a, the transmission timing T3 of the base station apparatus 200b, and the reception timing T4 of the base station apparatus 200b are the same. In the present embodiment, because the transmission and reception timings of each base station apparatus are synchronized, as shown in FIG. 7 the transmission timing calculating unit 351 changes the transmission timing T8 to the base station apparatus 200b that is the re-connection destination candidate with respect to the transmission timing T7 of the base station apparatus 200a currently performing communication forward by an amount of $T_U$. $T_U$ is the difference between the uplink propagation delay $T_{B\_U}$ of the base station apparatus 200b and the uplink propagation delay $T_{A\_U}$ of the base station apparatus 200a. In the present embodiment, $T_U$ is calculated, as shown below, as the difference between the downlink propagation delay $T_{B\_D}$ of the base station apparatus 200b and the downlink propagation delay $T_{A\_D}$ of the base station apparatus 200a.

The uplink and the downlink with respect to a given base station apparatus pass over the same propagation path in reverse directions. Given this, in the present embodiment, the uplink propagation delay $T_{A\_U}$ of the base station apparatus 200a and the downlink propagation delay $T_{A\_D}$ of the base station apparatus 200a are treated as being equal. The propagation delay $T_{A\_U}$ is the difference between the transmission timing T7 to the base station apparatus 200a in the mobile station apparatus 300a and the reception timing T2 of the base station apparatus 200a. The propagation delay $T_{A\_D}$ is the difference between the transmission timing T1 of the base station apparatus 200a and the reception timing T5 of the base station apparatus 200a in the mobile station apparatus 300. In the same manner, the uplink propagation delay $T_{B\_D}$ of the base station apparatus 200b and the downlink propagation delay $T_{B\_D}$ of the base station apparatus 200b are treated as being equal. The propagation delay $T_{B\_D}$ is the difference between the transmission timing T8 to the base station apparatus 200b in the mobile station apparatus 300a and the reception timing T4 of the base station apparatus 200b. The propagation delay $T_{B\_D}$ is the difference between the transmission timing T3 of the base station apparatus 200b and the reception timing T6 of the of the base station apparatus 200b in the mobile station apparatus 300. For this reason, $T_U$, which is the difference between the uplink propagation delay $T_{B\_D}$ of the base station apparatus 200b and the uplink propagation delay $T_{A\_U}$ of the base station apparatus 200a, is the same as $T_D$, which is the difference between the downlink propagation delay $T_{B\_D}$ of the base station apparatus 200b and the downlink propagation delay $T_{A\_D}$ of the base station apparatus 200a.

The reason for this is as follows. In LTE or LTE-A, time-division duplexing (TDD) and frequency-division duplexing (FDD) are used. In the case of TDD, because the uplink and the downlink are operated on the same frequency band, it is thought that the propagation delays are the same for both the uplink and the downlink. In the case of FDD, because the uplink and the downlink are operated on different frequency bands, there could be a difference between the propagation delays, because of the propagation path conditions for each of the frequency bands. The transmission timing of the mobile station apparatus 300, however, cannot be varied in real time, but rather is adjusted at some period, based on instructions from the base station apparatus. For this reason, the base station apparatus is such that it can receive even with some small offset in timing, thereby absorbing a difference in the propagation delay. Therefore, even if $T_U$ is thought to be the same as $T_D$, the difference therebetween can be absorbed.

In this manner, the re-connection destination candidate is decided in advance between the mobile station apparatus 300 and the base station apparatus, and the mobile station apparatus 300 decides the timing of transmission to the next reconnection candidate in advance.

Figure 8:
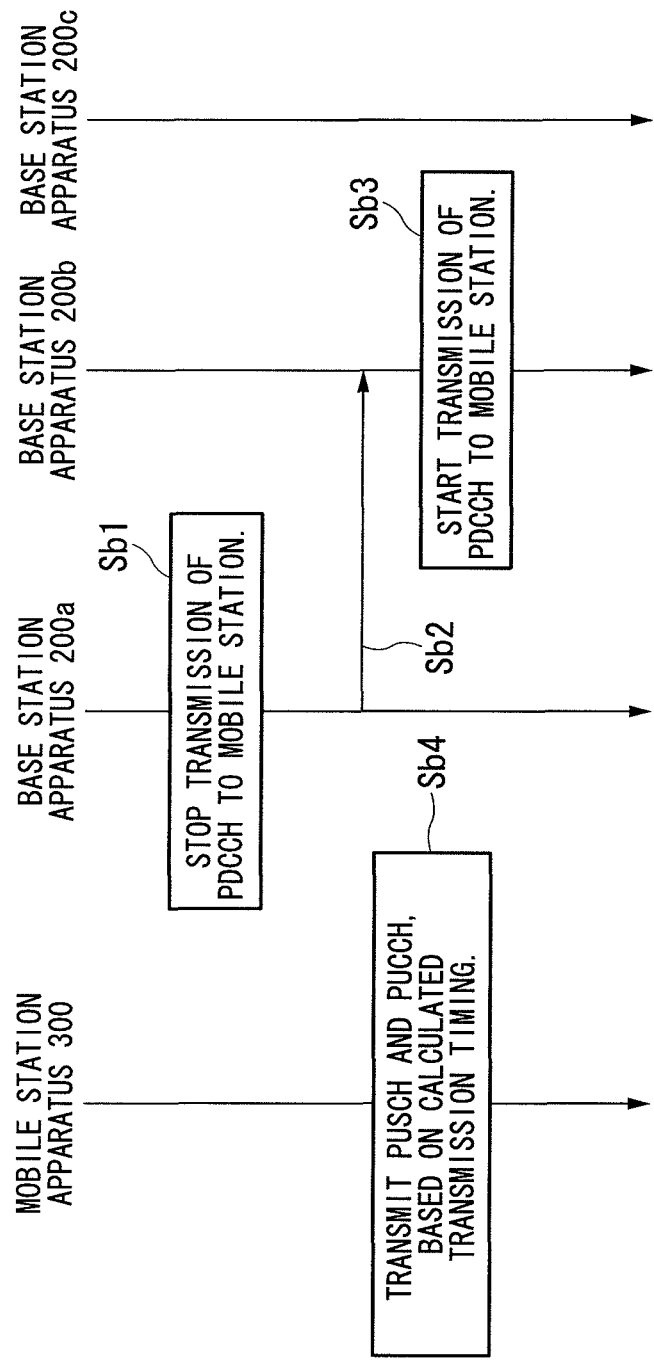
FIG. 8 is a sequence diagram describing the flow of processing when re-connecting in the same embodiment.

FIG. 8 is a sequence diagram describing the flow of processing when re-connecting. If the signal reception quality between the base station apparatus 200a and the mobile station apparatus 300 suddenly deteriorates and communication becomes impossible, the re-connection start notifying unit 252 of the base station apparatus 200a detects a disconnect of communication. The re-connection start notifying unit 252 that has detected the disconnect notifies, via the network 400, the base station apparatus 200b, which is the re-connection destination candidate of the mobile station apparatus 300 which is the other party with which communication disconnect was detected, that communication with the mobile station apparatus 300 is not possible, thereby requesting the start of re-connection (Sb2: Notification that communication is not possible). The control unit 205 controls the baseband unit 203 and stops the transmission of the Physical Downlink Control Channel PDCCH with respect to the mobile station apparatus 300 (Sb1).

Upon receipt of the notification that communication with the mobile station apparatus 300 is not possible, the base station apparatus 200b becomes, in place of the base station apparatus 200a, the base station apparatus that constitutes the anchor cell, and the re-connection processing unit 253 thereof controls the baseband unit 203 to transmit the Physical Downlink Control Channel PDCCH, which performs allocation of a communication frequency band, to the mobile station apparatus 300 (Sb3). At the mobile station apparatus 300, the re-connection processing unit 352 that had detected the communication disconnect controls the baseband unit 303 to cause reception of the Physical Downlink Control Channel PDCCH from the base station apparatus 200b and, based on the timing of transmission with respect to the base station apparatus 200b, that has been calculated by the transmission timing calculating unit 351, causes the transmission of the Physical Uplink Shared Channel PUSCH and the Physical Uplink Control Channel PUCCH (Sb4).

By doing this, it is possible to switch the base station apparatus that constitutes the anchor cell and perform re-connection in a short time, without performing banding searching and random-access processing when re-connecting.

Although in this present embodiment the SNR is measured as the signal quality for the purpose of deciding the re-connection destination candidate, there is no restriction to the SNR, and the received level or path loss of the reference signal RS may be alternatively used. Also, in Non-Patent Reference 2 the RSRP (Reference Signal Received Power) indicating the average received power of the reference signal RS is measured at the mobile station apparatus 300, and this value may be used as the received signal quality. Also, the RSRQ (Reference Signal Received Quality) indicating the average received signal quality of the reference signal RS is measured at the mobile station apparatus 300, and this value may also be used.

In the present embodiment, the measurement of the signal quality, the detection of the difference of the reception timing, and the deciding of the re-connection destination candidate may be performed periodically, with a period that is set in advance or may be performed at the timing decided by the mobile station apparatus 300. Alternatively, the timing of performing this processing may be established, for example, as the time at which the signal quality from the mobile station apparatus 300 changes by a prescribed amount, the base station apparatus 200a issuing an instruction to the mobile station apparatus 300. In the case of performing the above periodically, for example, the period may be made variable, for example making it longer, the better is the signal quality of the base station apparatus during communication.

Although the deciding of the re-connection destination candidate in the present embodiment is performed by the mobile station apparatus 300, this is not a restriction to this method, and the decision may be made based on the signal quality by the mobile station apparatus 300 reporting to the base station apparatus 200a a plurality of candidates, a decision being made of these candidates, for example, by the re-connection destination notifying unit 251 of the base station apparatus 200a, based on the load conditions of the other base station apparatuses 200b and 200c.

[Second Embodiment]

Figure 9:
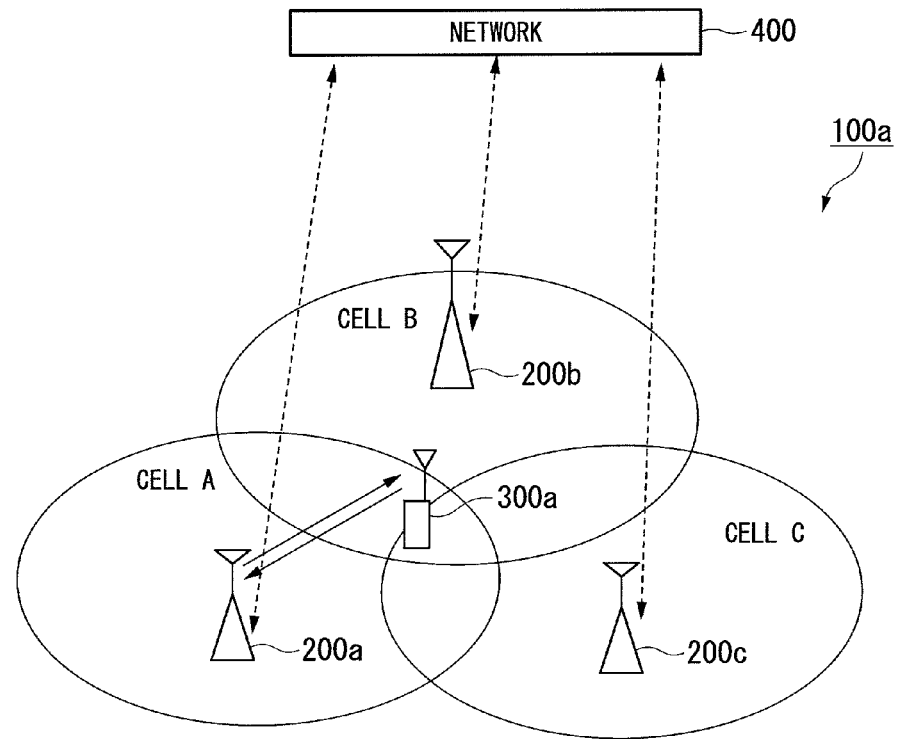
FIG. 9 is a simplified configuration drawing showing the constitution of a mobile communication system 100a in a second embodiment of the present invention.

A second embodiment of the present invention will be described below, with references made to the drawings. In the present embodiment, the description is for the case of the base station apparatus and the mobile station apparatus performing one-to-one communication, without performing CoMP (referred to hereinafter as non-CoMP). The physical layer in the present embodiment, similar to the first embodiment, is the same as the physical layer in LTE and LTE-A. FIG. 9 is a simplified configuration drawing showing the constitution of the mobile communication system 100a in the present embodiment. The mobile communication system 100a in the present embodiment is an example of non-CoMP. The mobile communication system 100a has the base station apparatus 200a, the base station apparatus 200b, the base station apparatus 200c, the mobile station apparatus 300a, and the network 400.

Each of the base station apparatuses 200a, 200b, and 200c is the same as the base station apparatuses 200a, 200b, and 200c in FIG. 1, and have the cells A, B, and C, which are the areas within which communication with the mobile station apparatus 300 is possible, although transmission timing of these base apparatuses is not synchronized. The base station apparatuses 200a, 200b, and 200c are linked via the network 400, and communicate with the mobile station apparatus 300a by wireless. Downlink data is transmitted only from the base station apparatus 200a to the mobile station apparatus 300a, and the mobile station apparatus 300a transmits uplink data only to the base station apparatus 200a.

That is, the mobile station apparatus 300a receives the Physical Downlink Shared Channel PDSCH transmitted from the base station apparatus 200a and demodulates data. In order to demodulate the Physical Downlink Shared Channel PDSCH, it is necessary to receive each of the Physical Downlink Control Channel PDCCH that transmits scheduling information, the Physical Control Format Indicator Channel PCFICH required to receive the Physical Downlink Control Channel PDCCH, and the Reference Signal RS required to predict the channel, the mobile station apparatus 300a receiving all of these from the base station apparatus 200a.

Because the mobile station apparatus 300a transmits only to the base station apparatus 200a with regard to the uplink data, only the base station apparatus 200a receives the Physical Uplink Shared Channel PUSCH transmitted by the mobile station apparatus 300a. Therefore, the mobile station apparatus 300a receives from the base station apparatus 200a the Physical Hybrid ARQ Indicator Channel PHICH that notifies the ACK/NACK of HARQ with respect to the Physical Uplink Shared Channel PUSCH. For the mobile station apparatus 300a to transmit ACK/NACK of the HARQ with respect to the Physical Downlink Shared Channel PDSCH, it is necessary to transmit the Physical Uplink Control Channel PUCCH, but the Physical Uplink Control Channel PUCCH is also received only by the base station apparatus 200a. The Reference Signal RS, which is necessary for demodulating the Physical Uplink Shared Channel PUSCH and the Physical Uplink Control Channel PUCCH are also only received by the base station apparatus 200a. Therefore, the uplink physical channels and signals are normally received only by the base station apparatus 200a.

As described in the first embodiment, in mobile communication, when the mobile station apparatus 300a and the base station apparatus 200a are performing voice or data communication, the mobile station apparatus 300a might move, for example, so that an obstacle such as a building comes between the mobile station apparatus 300a and the base station apparatus 200a, thereby causing a sudden deterioration in the receiving quality. In such a case, the mobile station apparatus 300a performs re-connection processing that connects to another base station apparatus with which the receiving quality is good.

Conventionally, in re-connection processing the mobile station apparatus has performed band searching and measured the quality of the signal from nearby base station apparatuses, taking base station apparatuses having good signal quality that is at least a certain level as re-connection destination base station apparatus candidates and selecting the re-connection destination from among them. In order to establish synchronization with the selected base station apparatus, the mobile station apparatus transmits to the selected the base station apparatus a random-access signal on the Physical Random-Access Channel PRACH and performs random access processing. In the random access processing, the transmission timing from the mobile station apparatus is adjusted, and the base station apparatus makes notification to the mobile station apparatus of information regarding the transmission timing. After that, the mobile station apparatus, based on this information, establishes synchronization and begins communication with the base station apparatus.

In the present embodiment, even if transmission timing of the base station apparatuses is not synchronized, the re-connection destination base station apparatus candidate is decided between the mobile station apparatus 300a and the base station apparatus 200a in advance and, with regard to the transmission timing adjustment to be made in the random access processing when re-connecting, the mobile station apparatus 300a calculates the transmission timing for transmission in advance, the switching of the base station apparatuses being performed in a short time, without performing band searching and random-access processing when re-connecting. The present embodiment is described below.

The constitution of the base station apparatus 200a is the same as the base station apparatus 200a of the first embodiment as shown in FIG. 1. Although synchronization between the base station apparatuses is required for the purpose of performing CoMP in the first embodiment, synchronization of communication timing is not necessarily required in the present embodiment. Therefore, communication between the base station apparatuses is asynchronous. Because the method for deciding transmission timing to the next candidate is different between the mobile station apparatus 300a and the mobile station apparatus 300 of the first embodiment as shown in FIG. 1, it is different with regard to the provision of a transmission timing calculating unit 351a instead of the transmission timing calculating unit 351. With this exception, the constitution is the same as the mobile station apparatus 300 of the first embodiment.

Figure 10:
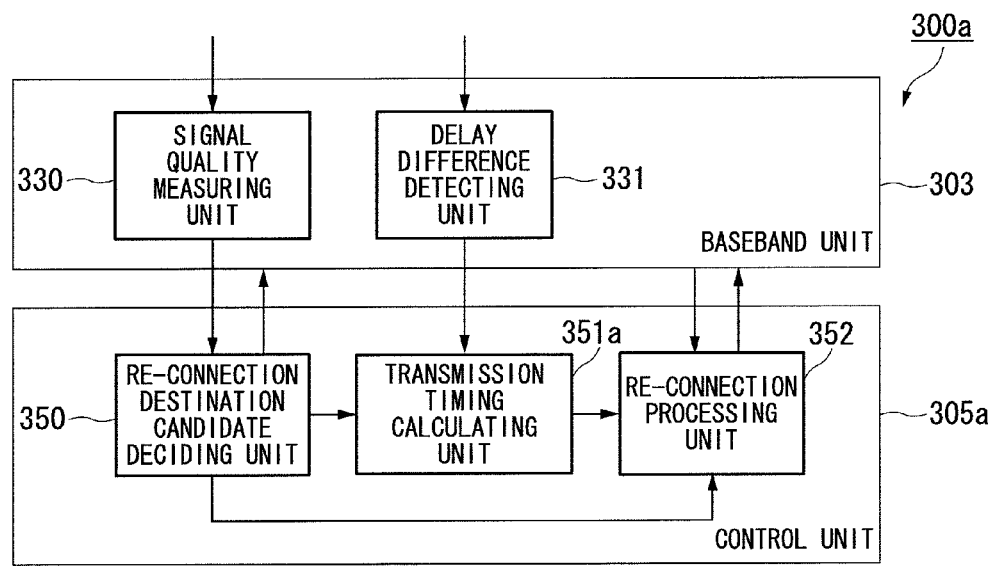
FIG. 10 is a simplified block diagram showing the constitution of a baseband unit 303 and a control unit 305a of a mobile station apparatus 300a in the same embodiment.

FIG. 10 is a simplified block diagram showing the constitution of the baseband unit 303 and the control unit 305a of the mobile station apparatus 300a in the present embodiment. In this drawing, parts corresponding to parts in FIG. 3 are assigned the same reference numerals (303, 330, 331, 350 and 352) and are not described herein. The control unit 305a has the re-connection destination candidate deciding unit 350, the transmission timing calculating unit 351a, and the re-connection processing unit 352. The transmission timing calculating unit 351a calculates the timing of transmission to the re-connection destination candidate base station apparatus. In the first embodiment, with the precondition that the timing of communication of the base station apparatuses is synchronized, the timing of transmission to the re-connection destination candidate base station apparatus is calculated. In the present embodiment, however, because the timing of transmission of the base station apparatuses is not synchronized, it is different from the calculation method of transmission timing with the first embodiment.

Figure 11:
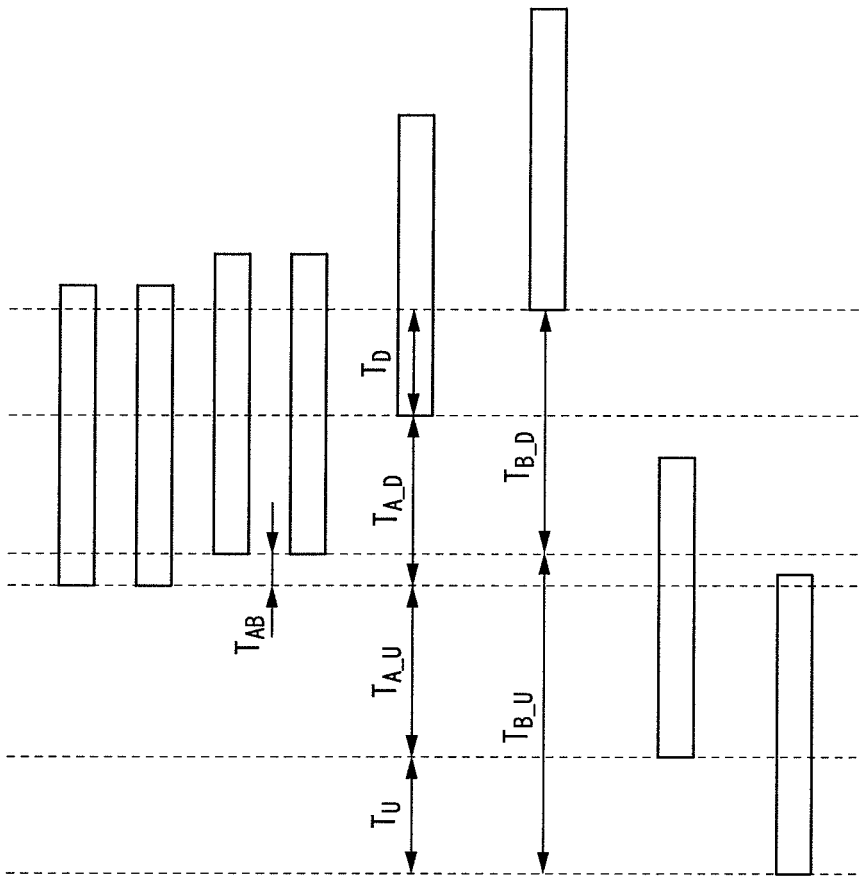
FIG. 11 is a drawing describing the method of calculating of transmission timing by a transmission timing calculating unit 351a in the same embodiment.
Figure 12:
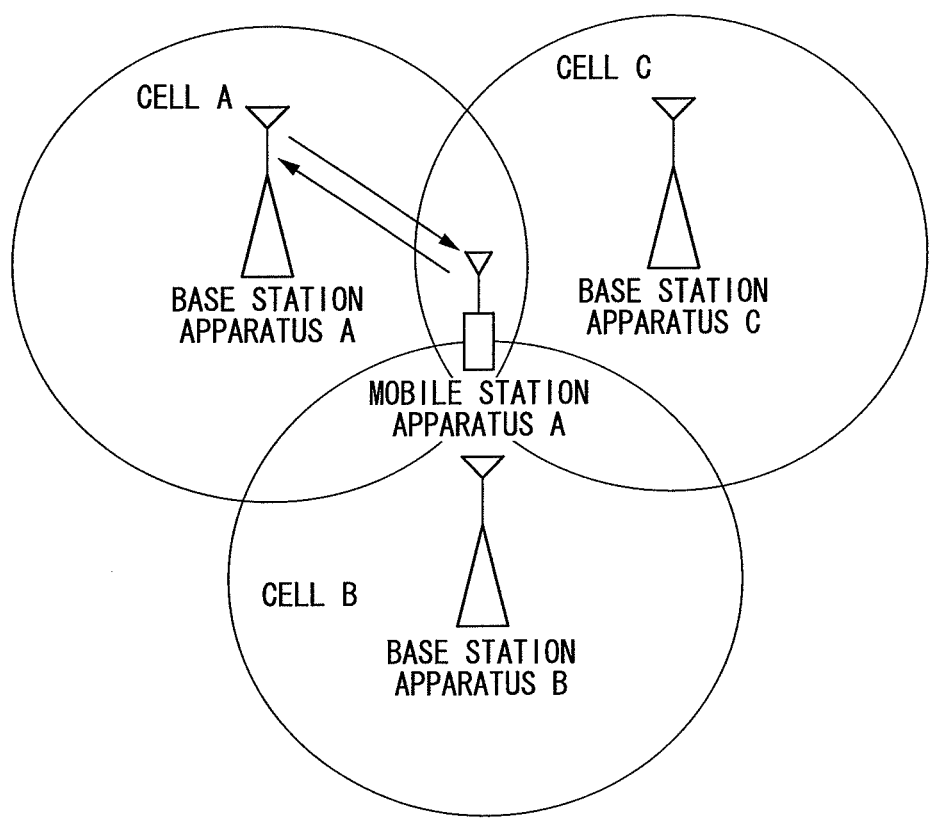
FIG. 12 is a drawing showing an example of the positional relationship between a mobile station apparatus and base station apparatuses in a conventional mobile communication system.

FIG. 11 is a drawing describing the method of calculating of transmission timing by a transmission timing calculating unit 351a. In the present embodiment, as in the first embodiment, the uplink and downlink propagation delays are treated as being the same. The transmission timing calculating unit 351a determines, from the following relationship, the difference $T_U$ between a transmission timing to the base station apparatus 200b that is the re-connection destination candidate and a transmission timing of the base station apparatus 200a with which the mobile station apparatus 300a currently communicates, from the transmission and reception timing difference $T_{AB}$ between the base station apparatus 200a and the base station apparatus 200b, and from the timing difference $T_D$ between the signals of the base station apparatus 200a and the base station apparatus 200b that are received at the mobile station apparatus 300a.

The calculating method of $T_U$ by the transmission timing calculating unit 351a will be described below. The symbol T1a is the transmission timing of the base station apparatus 200a. The symbol T2a is the reception timing of the base station apparatus 200a. The symbol T3a is the reception timing of the base station apparatus 200b. The symbol T4a is the reception timing of the base station apparatus 200b. The symbol T5a is the reception timing of signal by the base station apparatus 200a in the mobile station apparatus 300a. The symbol T6a is the reception timing of signal by the base station apparatus 200b in the mobile station apparatus 300a. The symbol T7a is the transmission timing of signal to the base station apparatus 200a in the mobile station apparatus 300a. The symbol T8a is the transmission timing of signal to the base station apparatus 200b in the mobile station apparatus 300a. The transmission timing T1a and the reception timing T2a are the same. The transmission timing T3a and the reception timing T4a are the same. As shown in FIG. 11, first, the timing difference $T_D$ between the reception timing T5a and reception timing T6a is the sum of the difference $T_{AB}$ between the transmission and reception timings T1a, T2a and the transmission and reception timings T3a, T4a and the difference $T_{B\_D} - T_{A\_D}$ between the propagation delay $T_{B\_D}$ of a signal of the base station apparatus 200b and the propagation delay $T_{A\_D}$ of a signal of the base station apparatus 200a in the mobile station apparatus 300a, this being expressed by Equation (2).

$$T_D = T_{AB} + T_{B\_D} - T_{A\_D} \tag{2}$$

Therefore, Equation (3) holds:

$$T_{B\_D} - T_{A\_D} = T_D - T_{AB} \tag{3}$$

Also, as shown in FIG. 11, the difference $T_U$ between a transmission timing to the base station apparatus 200a and a transmission timing to the base station apparatus 200b in the mobile station apparatus 300a is the value obtained by subtracting the transmission and reception timing difference $T_{AB}$ between the base station apparatus 200a and the base station apparatus from the difference $T_{B\_U}-T_{A\_U}$ between the propagation delay of a signal of the base station apparatus 200b and the propagation delay of a signal to the base station apparatus 200a in the mobile station apparatus 300a, this being expressed by Equation (4).

$$T_U = T_{B\_U} - T_{A\_U} - T_{AB} \quad (4)$$

Because if the propagation delays of an uplink and downlink are taken to be the same, $T_{B\_U}=T_{A\_U}$ and $T_{B\_D}=T_{B\_U}$ are hold, by substituting this into Equation (4), Equation (5) is obtained. Furthermore, by substituting Equation (3), Equation (6) for calculating $T_U$ is obtained.

$$T_U = T_{B\_D} - T_{A\_D} - T_{AB} \quad (5)$$
$$= T_D - T_{AB} - T_{AB}$$
$$= T_D - 2T_{AB} \quad (6)$$

The symbol $T_{AB}$ is calculated by exchanging each timing information via the network 400 between the base station apparatus 200a and the base station apparatus 200b. For example, each of the base station apparatus 200a and the base station apparatus 200b has a GPS (Global Positions System) receiving function and the control units 205 of each of the base station apparatuses compares absolute time obtained by utilizing the received GPS signal, thereby generating timing information, and the generated timing information is exchanged, then the timing difference $T_{AB}$ between the base station apparatus 200a and the base station apparatus 200b is calculated. The control unit 205 of the base station apparatus 200a performs wireless transmission of this timing difference $T_{AB}$ to the mobile station apparatus 300a via the baseband unit 203, the wireless unit 202 and the antenna 201. This wireless transmission may be performed individually to the mobile station apparatus 300a using the Physical Downlink Shared Channel PDSCH, or may be performed by a broadcast transmission to all of the mobile station apparatus using the Physical Broadcast Channel PBCH. The mobile station apparatus 300a receives and stores this timing difference $T_{AB}$ in advance, to use this for calculating $T_U$ by the transmission timing calculating unit 351a.

By doing this, it is possible to switch the base station apparatus and re-connection in a short time, without performing banding searching and random-access processing when re-connecting, similar to the case of the first embodiment.

The mobile station apparatus 300a may report the measured $T_D$ to the base station apparatus 200a or the base station apparatus 200b, and the base station apparatus 200a or the base station apparatus 200b may calculate $T_U$.

Although in this present embodiment the SNR is measured as the signal quality for the purpose of deciding the re-connection destination candidate, there is no restriction to the SNR, and the received level or path loss of the reference signal RS may be alternatively used. Also, in Non-Patent Reference 2 the RSRP (Reference Signal Received Power) indicating the average received power of the reference signal RS is measured at the mobile station apparatus 300a, and this value may be used as the received signal quality. Also, the RSRQ (Reference Signal Received Quality) indicating the average received signal quality of the reference signal RS is measured at the mobile station apparatus 300a, and this value may also be used.

In the present embodiment, the measurement of the signal quality, the detection of the difference of the reception timing, and the deciding of the re-connection destination candidate may be performed periodically, with a period that is set in advance or may be performed at the timing decided by the mobile station apparatus 300a. Alternatively, the timing of performing this processing may be established, for example, as the time at which the signal quality from the mobile station apparatus 300a changes by a prescribed amount, the base station apparatus 200a issuing an instruction to the mobile station apparatus 300a. In the case of performing the above periodically, for example, the period may be made variable, for example making it longer, the better is the signal quality of the base station apparatus during communication.

Although the deciding of the re-connection destination candidate in the present embodiment is performed by the mobile station apparatus 300a, this is not a restriction to this method, and the decision may be made based on the signal quality by the mobile station apparatus 300a reporting to the base station apparatus 200a a plurality of candidates, a decision being made of these candidates, for example, by the re-connection destination notifying unit 251 of the base station apparatus 200a, based on the load conditions of the other base station apparatuses 200b and 200c.

Alternatively, a program for the purpose of implementing the functions of the baseband unit 303, the control unit 305, the signal quality measuring unit 330, the delay difference detecting unit 331, the re-connection destination candidate deciding unit 350, the transmission timing calculating unit 351, and the re-connection processing unit 352 in FIG. 3, the control unit 205, the re-connection destination registering unit 250, the re-connection destination notifying unit 251, the re-connection start notifying unit 252, and the re-connection processing unit 253 in FIG. 5, and the baseband unit 303, the control unit 305a, the signal quality measuring unit 330, the delay difference detecting unit 331, the re-connection destination candidate deciding unit 350, the transmission timing calculating unit 351a, and the re-connection processing unit 352 in FIG. 10 may be recorded on a computer-readable recording medium, and a computer system may be caused to read and execute the program recorded on the record medium, thereby performing various parts of processing. The term "computer system" used herein includes an operating system and also hardware, such as peripheral devices.

The term "computer system" also includes a webpage-providing environment (or display environment) if the WWW system is used.

The term "computer-readable recording medium" refers to a portable medium, such as a flexible disk, an optical-magnetic disc, a ROM, and a CD-ROM, and a storage device, such as a hard disk that is built into a computer system. The term "computer-readable recording medium" includes something that dynamically retains a program for a short time, for example, a communication line when the program is transmitted via a network such as the Internet, and a communication line such as a telephone line, as well as a medium to retain a program for a certain time, for example, a flash memory internally provided in a computer system acting as the server and client in that case. The program may have the object of implementing a part of the above-described functions, and it may also implement the above-described functions in combination with a program already stored in a computer system.

Although the embodiments of the present invention have been described with references made to the accompanying drawings, the specific constitution is not limited to the embodiments, and various designs, changes, and the like are encompassed within the scope thereof, without departing from the spirit of the present invention.

Reference Symbols 100, 100a: Mobile communication system
200a, 200b, 200c: Base station apparatus
201: Antenna
202: Wireless unit
203: Baseband unit
204: Network interface unit
205: Control unit
250: Re-connection destination registering unit
251: Re-connection destination notifying unit
252: Re-connection start notifying unit
253: Re-connection processing unit
300, 300a: Mobile station apparatus
301: Antenna
302: Wireless unit
303: Baseband unit
304: User interface unit
305, 305a: Control unit
330: Signal quality measuring unit
331: Delay difference detecting unit
350: Re-connection destination candidate deciding unit
351, 351a: Transmission timing calculating unit
352: Re-connection processing unit
400: Network

The invention claimed is:

1. A mobile communication system comprising:
a mobile station apparatus;
a first base station apparatus configured to perform a first communication with the mobile station apparatus before the mobile station apparatus performs a re-connection; and
a second base station apparatus configured to perform a second communication with the mobile station apparatus after the mobile station apparatus performs the re-connection,
wherein the mobile station apparatus comprises:
an antenna;
a delay difference detector configured to detect a difference between a first reception timing at which the mobile station apparatus receives, by the antenna, a first signal from the first base station apparatus and a second reception timing at which the mobile station apparatus receives, by the antenna, a second signal from the second base station apparatus;
a calculator configured to calculate a predetermined time based on the difference detected by the delay difference detector; and
a re-connection processor configured to start the second communication by transmitting, by the antenna, to the second base station apparatus, a first transmission signal, the calculated predetermined time before a first transmission timing at which a first transmission signal is to be transmitted to the first base station apparatus, the start of the second communication being performed in a case that a disconnection of the first communication is detected.

2. The mobile communication system according to claim 1, wherein
the mobile station apparatus comprises a signal quality measurer configured to measure a signal quality with respect to the first base station apparatus, and the second base station apparatus, and
at least one of the mobile station apparatus and the first base station apparatus comprises a re-connection destination candidate decider configured to decide the second base station apparatus based on the signal quality measured by the signal quality measurer.

3. The mobile communication system according to claim 2, wherein the signal quality measurer is configured to periodically measure a signal quality and the delay difference detector is configured to periodically detect a difference in a third reception timing.

4. The mobile communication system according to claim 3, wherein a first period with which the signal quality measurer measures the signal quality and a second period with which the delay difference detector detects the difference are variable.

5. The mobile communication system according to claim 2, wherein the first base station apparatus is configured to instruct the mobile station apparatus of a first timing for measuring the signal quality measured by the signal quality measurer and a second timing for detecting the difference detected by the delay difference detector.

6. The mobile communication system according to claim 2, wherein the first base station apparatus comprises a re-connection destination notifier configured to notify the second base station apparatus of information decided by the re-connection destination candidate decider.

7. A mobile station apparatus performing a first communication with a first base station apparatus before the mobile station apparatus performs a re-connection, and performing a second communication with a second base station apparatus after the mobile station apparatus performs the re-connection, the mobile station apparatus comprising:
an antenna;
a delay difference detector configured to detect a difference between a first reception timing at which the mobile station apparatus receives, by the antenna, a first signal from the first base station apparatus and a second reception timing at which the mobile station apparatus receives, by the antenna, a second signal from the second base station apparatus;
a calculator configured to calculate a predetermined time based on the difference detected by the delay difference detector; and
a re-connection processor configured to start the second communication by transmitting, by the antenna, to the second base station apparatus, a first transmission signal, the calculated predetermined time before a first transmission timing at which a first transmission signal is to be transmitted to the first base station apparatus, the start of the second communication being performed in a case that a disconnection of the first communication is detected.

8. A re-connection method in which a mobile station apparatus performs a first communication with a first base station apparatus before the mobile station apparatus performs a re-connection, and the mobile station apparatus performs a second communication with a second base station apparatus after the mobile station apparatus performs the re-connection; the re-connection method comprising:
detecting, by the mobile station apparatus, a difference between a first reception timing at which the mobile station apparatus receives a first signal from the first base station apparatus and a second reception timing at which the mobile station apparatus receives a second signal from the second base station apparatus;
calculating, by the mobile station apparatus, a predetermined time based on the detected difference between the first and second reception timings; and
starting, by the mobile station apparatus, the second communication by transmitting, to the second base station apparatus, a first transmission signal, the calculated predetermined time before a first transmission timing at which at which a first transmission signal is to be transmitted to the first base station apparatus, the start of the second communication being performed in a case that a disconnection of the first communication is detected.

9. The mobile communication system according to claim 1, wherein the calculator is configured to use a first value as the predetermined time, the first value being calculated by subtracting the first reception timing from the second reception timing.

10. The mobile communication system according to claim 1, wherein the calculator is configured to use a second value as the predetermined time, the second value being calculated by subtracting a first calculation value from a second calculation value, the first calculation value having a double value of a third calculation value, the third calculation value being calculated by subtracting a second transmission timing at which the first base station apparatus sent the first signal from a third transmission timing at which the second base station apparatus sent the second signal, the second calculation value being calculated by subtracting the first reception timing from the second reception timing.

* * * * *